(No Model.)
E. B. MEYROWITZ & C. E. DRESSLER.
OPTICIAN'S MEASURING INSTRUMENT.
No. 397,744. Patented Feb. 12, 1889.
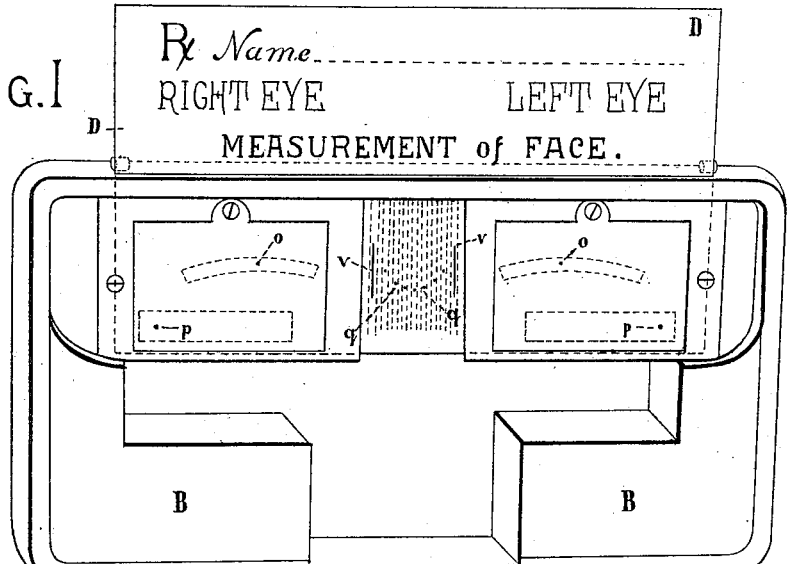
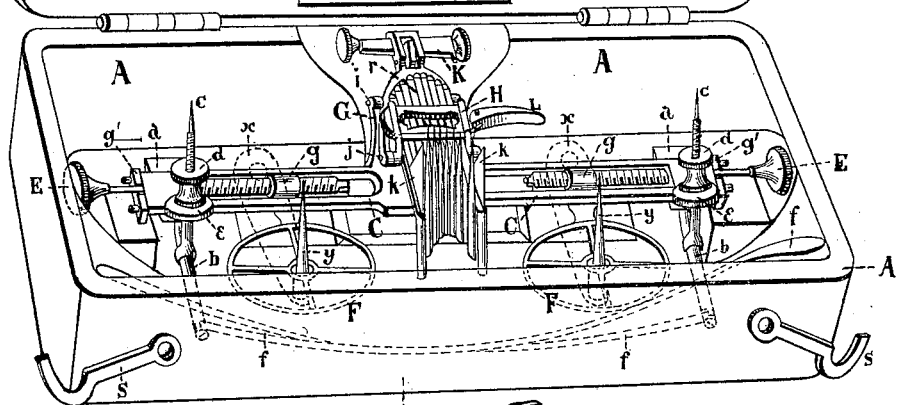
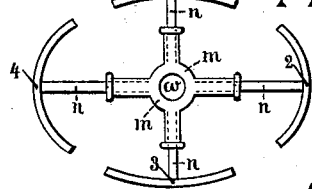
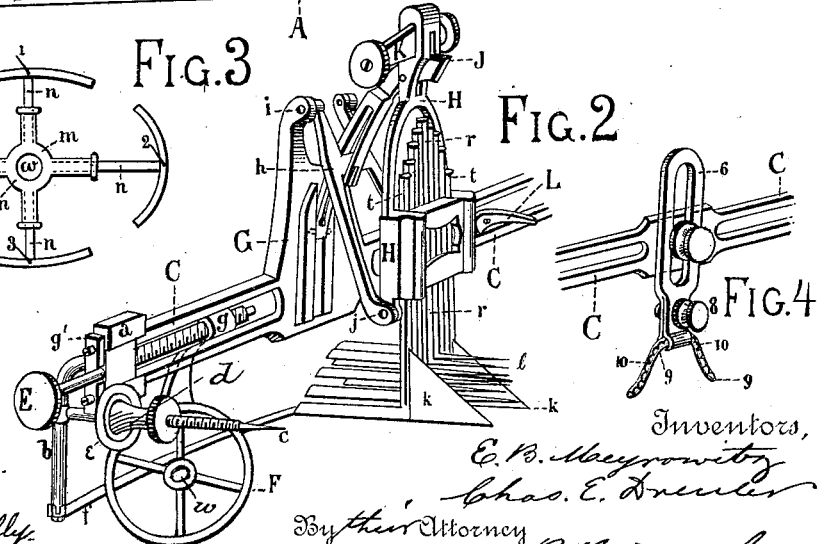
Witnesses
Leo Von Rosenberg
Francis P. Reilly
Inventors,
E. B. Meyrowitz
Chas. E. Dressler
By their Attorney
P. W. Voorhees

UNITED STATES PATENT OFFICE.

EMIL B. MEYROWITZ AND CHARLES E. DRESSLER, OF NEW YORK, N. Y.; SAID DRESSLER ASSIGNOR TO SAID MEYROWITZ.

OPTICIAN'S MEASURING-INSTRUMENT.

SPECIFICATION forming part of Letters Patent No. 397,744, dated February 12, 1889.

Application filed March 8, 1888. Serial No. 266,627. (No model.)

*To all whom it may concern:*

Be it known that we, EMIL B. MEYROWITZ and CHARLES E. DRESSLER, each of the city of New York, in the county and State of New York, have jointly invented certain new and useful means or apparatus for taking and recording measurements of the face for the use of opticians or oculists, from which to make spectacles or eyeglasses, which invention is fully set forth and illustrated in the following specification and accompanying drawings.

The object of this invention is to provide an instrument accurately adjustable, from which, in any of its adjustments, one or more permanent impressions or patterns may be taken for preservation.

The invention will first be described in detail, and then particularly set forth in the claims.

In the accompanying drawings, Figure 1 shows the instrument in perspective set in a case or box, within which it is suited to be placed for more readily transferring to a blank of paper or other suitable material the desired measurements to which the instrument has been adjusted. Fig. 2 shows in perspective the instrument detached from its box or case, one side being omitted, the duplicate merely of the other. Fig. 3 shows detached a view of one of the adjustable ovals or lens-gages. Fig. 4 shows a modified form of adjustable nose-measuring device hereinafter particularly described.

In said figures the several parts are indicated by letters, as follows:

A indicates the bottom of a box; B, its top; C, the measuring-instrument within the bottom of the box, and D the order or measure blanks inserted in the cover of the box and already punctured by the instrument, as will be hereinafter described.

The measuring-instrument C is composed of the following-named parts: Near each end of its frame a cross-head, $a$, is made to slide adjustably thereon. Springing from each of said cross-heads is a temple arm or rod, $b$, and fast to each of said arms is a pin, $c$, screw-threaded and provided with a thumb-nut, $d$, by screwing either of which nuts hard up against its washer $e$ either cross-head is jammed or set fast at any desired point on the frame of the instrument. Hinged or pivoted to the arms $b$ are the bows $f$ of the instrument, made similar to and performing the same office as the ordinary bows of spectacles, for securing them to the wearer's face by catching over the ears.

At each end the frame of the instrument is provided with thumb-screws E, whose threads work through traveling nuts $g$, the bodies of said screws being secured in the frame so as to have only rotary motion and their outer ends working in the end guides, $g'$. To said nuts $g$ are secured the lens-gages F, so that said gages can be each separately adjusted by means of the thumb-screws E to stand fixed with their centers each exactly opposite the pupil of each eye.

From the center of the frame of the instrument C a forked offset, G, rises, to which is hung by a connecting-frame, $h$, a carriage, H. Said offset and said carriage are pivotally united to the frame $h$ at the points $i j$. From said offset a bent arm, J, springs, and, spanning the frame $h$, passes through a slot in the top of the carriage H, the carriage being clamped fast upon the curved top of said arm by the adjusting-wedge K. The lower part of the carriage H contains a number of rods, $r$, each provided with an offset needle or pin, $l$, and it also contains two bars, $t$, each on the outside of said rods. The bars $t$, instead of offset needles or pins, contain each a triangular knife, $k$. These rods and bars $r$ and $t$ are permitted for their adjustments to slide freely up and down until clamped each in the position desired by the clamp L, which secures them rigidly as set in the carriage H.

The box A B can be neatly hinged, as shown in Fig. 1, and provided with hooks $s s$, as shown, for keeping the top or lid closed like any usual instrument-case.

The lens-gages F are made adjustable, as shown in Fig. 3, in order to register the desired size of lens. The hole $w$ in the center of the gage being set opposite the pupil of the eye, the peripheral arcs carrying the pins 1 2 3 4 are then slid by their arms $n$ in or out of the cross-socket piece $m$, containing the center hole, $w$. This operation, it is obvious, will enlarge or diminish the perimeter of the gage and correspondingly change the positions of the pins 1 2 3 4.

In order to obtain the desired measurements for fitting a pair of spectacles or eyeglasses, the procedure is as follows: The instrument or apparatus, having been removed from its case, is placed upon the face as if a pair of spectacles, and secured thereon in the same manner, either by the bows *f* or by an elastic or metallic band, or otherwise, as may be desired. If a band be used, it may be attached to short rods to reach the temples, secured to the arms *b*, like the bows *f*. The adjustments of the instrument are then made as follows: For the distance between the temples the pins are set in position by the adjusting-screws E. The ovals or lens-gages F are then adjusted laterally by means of the screws E until the center hole, *w*, in each of said gages is directly opposite the pupil of each eye. The distance then between said holes gives the exact distance which the pupils of the eyes are apart and also from the nose, each eye not being necessarily equidistant from the nose. To determine the contour and height of the nose, the steel rods *r* are permitted to move freely up and down in the carriage by means of the releasing-lever L, so that said bars may follow the lines or contour of the nose across the bridge. When so adjusted, the lens-gages being in line with the pupils, as before explained, the lever L is pressed downward, tightening said bars, all in the positions, respectively, imparted to them by the shape of the nose at their several points of pressure thereon.

In order to adjust the nose-piece or carriage H, containing the steel rods and bars *r t*, in its proper plane, the carriage is moved inward or outward—that is, backward or forward—until the lens-gages F clear the eyelashes, when by pressing on the wedge K the nose-piece is fixed or clamped in the position desired. Now, for the size of the lenses desired, the arrangement shown in Fig. 3 is brought into use. For this purpose the oval lens-gage F has the arc-pieces and pins 1 2 3 4, hereinbefore described, adjustable on arms set within the cross-sockets perforated for the pupil-gages, as before described. Each of said four pieces is provided with a pin, and each piece can be readily adjusted to form a perimeter suitable for the size of lens desired.

The manipulations or operations above described have given the measurements needed in order to make spectacles or eyeglasses properly fitting the wearer—that is to say, distance between temples; distance between pupils; height of bridge of nose from line of pupils to crest; shape or contour of nose across and on the sides of the bridge, and whether the bridge of the spectacles should be set in front of or behind the plane of the lenses; size of lenses required.

In order to make a permanent record of said measurements, after the instrument has been carefully adjusted to the face, as above described, it is removed from the face and returned to the box, for convenience provided for it, from which at first taken, as above mentioned, though the box is not a necessity. In said box are two arms or levers, *x*, each secured thereto by a screw or rivet at one end, while the other end is provided with a needle or pin, *y*, set at right angles to its arm or lever. Said arms being movable on their screws or rivets as centers, permit their pins to accommodate themselves to and register with the center-holes in the lens-gages and to protrude through when said gages are pressed down over said needles or pins. The points of said pins are thus brought exactly in the points opposite the centers of the lenses or the pupils of the eyes. The distance between the temples is already secured by the pins *c*. The height and shape of the bridge of the nose are marked by the pins *l* set at right angles to the sliding bars *r*, already set, as described.

The distance of the crest of the bridge, either in front or back of the plane of the lenses, is registered by the two triangular knives *k* on the extreme bars *t*, which take the place of the pins on the intermediate bars, *r*, of the nose-measuring device. This register is thus read from the paper or blank hereinafter described. The length of the cuts made in the paper by these triangular knives determines the position of the bridge relative to the plane of the lenses. If the cut be one-quarter inch long, the top of the bridge of the spectacles or nose-piece should be in the same plane with the lenses. If one-eighth of an inch long, the top of the bridge should be one-eighth back of said plane, and if three-eighths of an inch long the top of the bridge should be one-eighth of an inch in front of said plane.

The size of the lenses proper to suit the size of the eyes is marked by the four pins 1 2 3 4, already set, attached one to each of the sections composing the lens-gages.

In order now to make a permanent record by transferring the measurements to paper, any suitable blank or several blanks together may be pressed down upon the pins and knives above mentioned, when each blank will be pricked and cut through by them; or it can be done by holding the blank or blanks against some soft substance, as cork, cloth, or felt. One copy or duplicate copies, or more, can thus be obtained. The cover of the box shown in Fig. 1 is constructed to conveniently contain one or more blanks, which may be termed "order-blanks." These blanks are passed through a slot in the edge of the cover, and thus fit smoothly over a metal templet, U, fixed in said cover, and so cut out as to permit the several pins and knives to penetrate the paper before passing through said templet. By now simply closing the top or cover of the box, the instrument having been placed therein, with its bows $f$ folded, all the measurements above enumerated will be pricked through the paper, leaving permanent impressions—such as shown in Fig. 1—in which the dots $o\ o$ indicate the distance between the pupils; $p\ p$, the distance between the temples; $q\ q$, the shape and height of nose, and the cuts $v\ v$ the position of the bridge of the nose in relation to the plane of the lenses, either in front or back of lenses. This order-blank (or blanks) can then be removed and copies taken, if desired, when from the data thus obtained the optician can construct or have constructed by workmen perfect-fitting eyeglasses or spectacles. Said order-blank may have printed thereon the name of the optician or instrument-maker and any necessary data, as well as arbitrary character, directory or otherwise, as sometimes appears upon druggists' prescriptions. In Fig. 1 is illustrated a specimen order-blank, the portion projecting above the top of the box having certain data written thereon in imitation of printing. Under said data may be written the measurements in figures of the distances registered by the several dots above mentioned, or any other measurements or memoranda desired.

In Fig. 4 is shown a modified adjustable nose-measuring device, consisting of a piece of lead wire or narrow band of sheet-lead or other non-elastic but easily-bent metal, set in a holding or clamping device adjustable on a frame for carrying other measuring devices, such as shown in the other figures. In said Fig. 4 C indicates a middle portion of the main frame, broken away at each end. From the center of said frame rises an adjustable guide, 6, having a screw-clamp, 7, tapped in the frame C, for clamping the guide to said frame.

To the guide 6 is also fitted a clamp thumb-screw, 8, which clamps the metal wire 9 to said guide, which is split for such purpose at its lower end. Said wire having been adjusted to the right part of the bridge of the nose by the clamping-screw 7, is then bent to exactly the contour of the nose across the bridge, a permanent "set" being thus given to the wire. This set said wire will of course, by careful handling, retain, when it can be moved and used as a templet, or its outlines may be transferred to paper by tracing, sun-printing on sensitized paper, or by making lead impression-marks on paper, its surface being serrated, as shown at 10, or provided with points like pins, which will make imprints on paper or other materials capable of receiving lead marks.

We do not confine ourselves exactly to the adjustable nose-measuring devices described, as it is evident that other forms of adjustable templets may be substituted therefor without departing from the principle of our invention, by which the bridge-contour of the nose may be ascertained, and from which said contour can be transferred either to paper or to metal directly by the hands of skilled workmen.

Having thus fully described our said instrument or apparatus as of our invention, we claim—

1. An apparatus for recording facial measurements from which to make spectacles or eyeglasses, consisting of a box or two-part frame, one part provided with a measuring-instrument having registering-points, and the other part provided with a templet counter-part for said registering-points and adapted to receive one or more papers or blanks, whereby the measurements are transferred to such paper or blanks when placed in position by the closing of the box or frame, substantially as and for the purposes set forth.

2. A measuring and registering instrument for opticians' use, consisting of a skeleton frame provided with adjustable temple bars or rods having secured thereto registering pins or points, substantially as and for the purposes set forth.

3. A measuring and registering instrument for opticians' use, consisting of a skeleton frame provided with lens-gages, as F, adjustable to bring central holes therein opposite the pupils of the eyes of the face measured, in combination with adjustable pins, as $y$, whereby said pins are adjusted to register the positions of said holes, substantially as and for the purposes set forth.

4. A measuring-instrument for opticians' use, consisting of a frame provided with an adjustable secondary frame or carriage containing a templet adjustable to the bridge of the nose, from and by means of which the contour of the same may be transferred, substantially as and for the purposes set forth.

5. A measuring-instrument for opticians' use, consisting of a skeleton frame provided with a nose-measuring device consisting of an adjustable carriage containing adjustable measuring-rods for obtaining the bridge-contour of the nose and preserving such contour after the withdrawal of the instrument from the parts measured by it, substantially as and for the purposes set forth.

6. A measuring and registering instrument for opticians' use, consisting of a skeleton frame provided with a nose-measuring device consisting of an adjustable carriage containing adjustable measuring-rods for obtaining the bridge-contour of the nose, provided with registering pins or points which preserve the contour after the withdrawal of the instrument from the parts measured by it, substantially as and for the purposes set forth.

7. A measuring and registering instrument for opticians' use, consisting of a skeleton frame provided with a nose-measuring device consisting of an adjustable carriage, as H, containing registering-knives which preserve the measurements effected by them after the withdrawal of the instrument from the parts measured by it, substantially as and for the purposes set forth.

8. A measuring-instrument for opticians' use, consisting of a skeleton frame carrying lens-gages, as F, provided with perimeters adjustable to varying sizes of eyes, substantially as and for the purposes set forth.

EMIL B. MEYROWITZ.
    CHARLES E. DRESSLER.

Witnesses:
 JOHN H. W. KILLEEN,
 JAMES L. HAYNES.